United States Patent
Lyman

(10) Patent No.: US 11,436,631 B2
(45) Date of Patent: Sep. 6, 2022

(54) SYSTEM AND METHOD FOR PROBABILISTIC MATCHING OF MULTIPLE EVENT LOGS TO SINGLE REAL-WORLD AD SERVE EVENT

(71) Applicant: Kinesso, LLC, New York, NY (US)

(72) Inventor: William Lyman, Nashville, TN (US)

(73) Assignee: Kinesso, LLC, New York, NY (US)

( * ) Notice: Subject to any disclaimer, the term of this patent is extended or adjusted under 35 U.S.C. 154(b) by 190 days.

(21) Appl. No.: 16/729,640

(22) Filed: Dec. 30, 2019

(65) Prior Publication Data

US 2020/0211058 A1 Jul. 2, 2020

Related U.S. Application Data

(60) Provisional application No. 62/786,533, filed on Dec. 30, 2018.

(51) Int. Cl.
| | |
|---|---|
| *G06Q 30/02* | (2012.01) |
| *G06F 16/95* | (2019.01) |
| *G06F 16/90* | (2019.01) |
| *G06N 7/00* | (2006.01) |
| *G06F 16/9536* | (2019.01) |
| *G06F 16/906* | (2019.01) |

(52) U.S. Cl.
CPC ....... *G06Q 30/0252* (2013.01); *G06F 16/906* (2019.01); *G06F 16/9536* (2019.01); *G06N 7/005* (2013.01)

(58) Field of Classification Search
CPC ............... G06Q 30/0241; G06Q 30/02; G06F 16/24568
See application file for complete search history.

(56) References Cited

U.S. PATENT DOCUMENTS

| | | | |
|---|---|---|---|
| 8,515,987 | B1 | 8/2013 | Jain et al. |
| 9,462,354 | B2 | 10/2016 | Phan et al. |
| 2009/0327075 | A1* | 12/2009 | Saadat ............... G06Q 30/0257 705/14.55 |
| 2010/0318418 | A1 | 12/2010 | Wertheimer et al. |
| 2011/0119125 | A1* | 5/2011 | Javangula .......... G06Q 30/0251 705/14.43 |
| 2011/0246267 | A1* | 10/2011 | Williams ........... G06Q 30/0275 705/14.4 |
| 2011/0246297 | A1* | 10/2011 | Buchalter .......... G06Q 30/0241 705/14.53 |

(Continued)

OTHER PUBLICATIONS

Bezett, Alice, "Are Multiple Ad Impressions on a Single Page a Big Deal?", www.bannerconnect.net (downloaded Oct. 3, 2018).

*Primary Examiner* — Saba Dagnew

(57) ABSTRACT

A system and method for accurately matching corresponding DSP event data and Ad-Server event data with associated with a single real-world ad serve event by (a) pairing DSP event data and Ad-Server event data into data pairs, (b) comparing various field data in associated source fields from each of the DSP event data and Ad-Server event data to determine if the field data is a match or unmatch, and (c) based on the likelihood that a match of field data in a particular source field indicates an overall event match, which is determined using a Bayesian analysis, determining the probability that the DSP event data and Ad-Server event data in the data pair truly corresponding to the same single real-world ad serve event.

12 Claims, 6 Drawing Sheets

(56) References Cited

U.S. PATENT DOCUMENTS

2011/0246298 A1* 10/2011 Williams ............... G06Q 30/08
            705/14.71
2015/0381712 A1* 12/2015 de Castro Alves ..........................
            G06F 16/24568
            709/201
2017/0061501 A1* 3/2017 Horwich ............... G06F 16/283

* cited by examiner

| Pair Index | Dcm Event Index | Ttd Event Index | State Match | State Match Value | City Match | City Match Value | Zip Match | Zip Match Value | OS Match | OS Match Value |
|---|---|---|---|---|---|---|---|---|---|---|
| 1 | 1 | 1 | 0 | null | 0 | null | 0 | null | 0 | null |
| 2 | 2 | 1 | 1 | CA | 0 | null | 1 | 12345 | 1 | Wind |
| 3 | 3 | 1 | 0 | null | 0 | null | 0 | null | 1 | Wind |
| 4 | 4 | 1 | 1 | NY | 1 | NY | 0 | null | 0 | null |
| 5 | 1 | 2 | 0 | null | 0 | null | 0 | null | 0 | null |
| 6 | 2 | 2 | 0 | null | 0 | null | 0 | null | 0 | null |
| 7 | 3 | 2 | 1 | CA | 1 | SF | 0 | null | 1 | Apple iOS |
| 8 | 4 | 2 | 0 | null | 0 | null | 0 | null | 1 | Wind |
| ... | ... | ... | ... | ... | ... | ... | ... | ... | ... | ... |

| Browser Match | Browser Match Value | Site Match | Site Match Value | 4-Digit Zip Match | 4-Digit Zip Match Value | 3-Digit Zip Match | 3-Digit Zip Match Value | 2-Digit Zip Match | 2-Digit Zip Match Value |
|---|---|---|---|---|---|---|---|---|---|
| 1 | Google Chrome | 0 | null | 0 | null | 0 | null | 0 | null |
| 0 | null | 0 | null | 1 | 1234 | 1 | 123 | 1 | 12 |
| 1 | Google Chrome | 1 | Twitter | 0 | null | 0 | null | 0 | null |
| 1 | Safari | 0 | null | 0 | null | 0 | null | 0 | null |
| 0 | null | 1 | Youtube | 0 | null | 0 | null | 0 | null |
| 0 | null | 0 | null | 0 | null | 0 | null | 0 | null |
| 1 | Safari | 1 | Cats.com | 1 | 1234 | 1 | 123 | 1 | 12 |
| 0 | null | 0 | null | 0 | null | 0 | null | 0 | null |
| ... | ... | ... | ... | ... | ... | ... | ... | ... | ... |

*FIG. 3B*

United States Patent US 11,436,631 B2

SYSTEM AND METHOD FOR PROBABILISTIC MATCHING OF MULTIPLE EVENT LOGS TO SINGLE REAL-WORLD AD SERVE EVENT

CROSS REFERENCE TO RELATED APPLICATIONS

This application claims the benefit of U.S. Provisional Patent Application No. 62/786,533, filed on Dec. 30, 2018, and entitled "Probabilistic Matching Bayesian Analysis." Such application is incorporated by reference herein in its entirety.

STATEMENT REGARDING FEDERALLY SPONSORED RESEARCH OR DEVELOPMENT

Not applicable.

BACKGROUND

In programmatic digital advertising, ad displays to digital users (each such display of an ad to a digital user is known an "impression") are automatically auctioned off when a digital user views an eligible display space on a browser or other content-viewing application. In a few milliseconds, a demand side platform ("DSP") processes bids for the impression on behalf of advertisers, and an Ad Server then delivers the winning advertiser's advertisement to the user's device. Both the DSP and the Ad Server provide event logs of all impressions to advertisers. For each such event, the two event logs contain different but related data, including multiple fields about the geographic location of the user, the time and date of the ad serve, characteristics of the user device's hardware and software, cost information, identifiers connected to units of the advertiser's larger strategy, and differing randomized identifiers for the user and/or the user's device.

Generally speaking, while this current technology allows for the generation of the two related event logs (one for the DSP and one for the Ad Server), the technology does not allow for connecting both event logs to a single real-world impression. Even if some association of the two event logs were possible, current technology does not provide any means for corroborating or verifying that the association between the two event logs is accurate. The ability to connect both a DSP log event and an Ad Server log event to a single real-world impression (and accurately corroborate the relationship between the DSP and Ad Server log events pair) allows for the connection of the two log events' associated data with the single real-world ad serve event. This larger set of associated data values in turn enables associating ad serve events over time with individual users or among cohorts of meaningfully similar individual users without violating any user's privacy.

BRIEF SUMMARY OF THE INVENTION

The present invention is generally directed to a system and method for matching corresponding DSP log events and Ad Server log events associated with a single real-world impression. The present invention allows for this matching of DSP log events and Ad Server log events into pairs corresponding to the same real-world impression by creating and quantifying two novel factors (independent geographic closeness factor and the sole rightful heir factor) from the event log data and applying probability and combinatoric game theoretical analysis to those factors. A pair that does respond to the same real-world impression may be referred to herein as a "Match" (likewise, a pair that does not respond to the same real-world impression is considered an "Unmatch"). By connecting pairs of DSP and Ad Server log events to a single real-world impression (i.e. determining for each pair of a number of candidate pairs that the specific pair is a Match), and thus the two log events' associated data, the invention creates a larger set of data values associated with a single impression (those from both the DSP event log and the ad server event log). This larger set of associated data values in turn enables associating impressions over time with individual users or among cohorts of meaningfully similar individual users without violating any user's privacy.

In one embodiment, the invention uses a mix of deterministic and probabilistic record matching, starting with events recorded over a short time period (for instance, 24 hours) in both the Ad Server and DSP logs. The invention uses an algorithm that, first, reduces the search space by segregating all events from the Ad Server's log during the selected time period and all events from the DSP's log during the same time period into "unit groups" corresponding to individual advertisers and to discrete units within each advertiser's larger strategy using certain identifying values in the log data. It then defines a time-difference window $W_T$ within which most Match pairs are expected to fall. It then compares every event from the Ad Server's log in a given unit group with every event from the DSP's log in the same group, first filtering out all pairs that do not fall within the time-difference window $W_T$ and then comparing the other field values for all remaining pairs. This creates a series of DSP-Ad Server candidate pairs, and each candidate pair can be classified as either a Match (the pair of log events do correspond to the same real-world event of a user being served an ad, or "impression") or an Unmatch (the pair of logs does not correspond to the same real-world impression). Based off a comparison of the data values of the DSP log and Ad Sever log of a particular candidate pair, the invention can calculate the probability that the DSP-Ad Server pair is a Match, by first calculating the probability that each given pairwise field value would appear if the pair were an Unmatch. These and other objects, features, and advantages of the present invention will become better understood from a consideration of the following detailed description of the preferred embodiments and appended claims in conjunction with the drawings as described following:

DETAILED DESCRIPTION OF THE INVENTION

Figure 1:
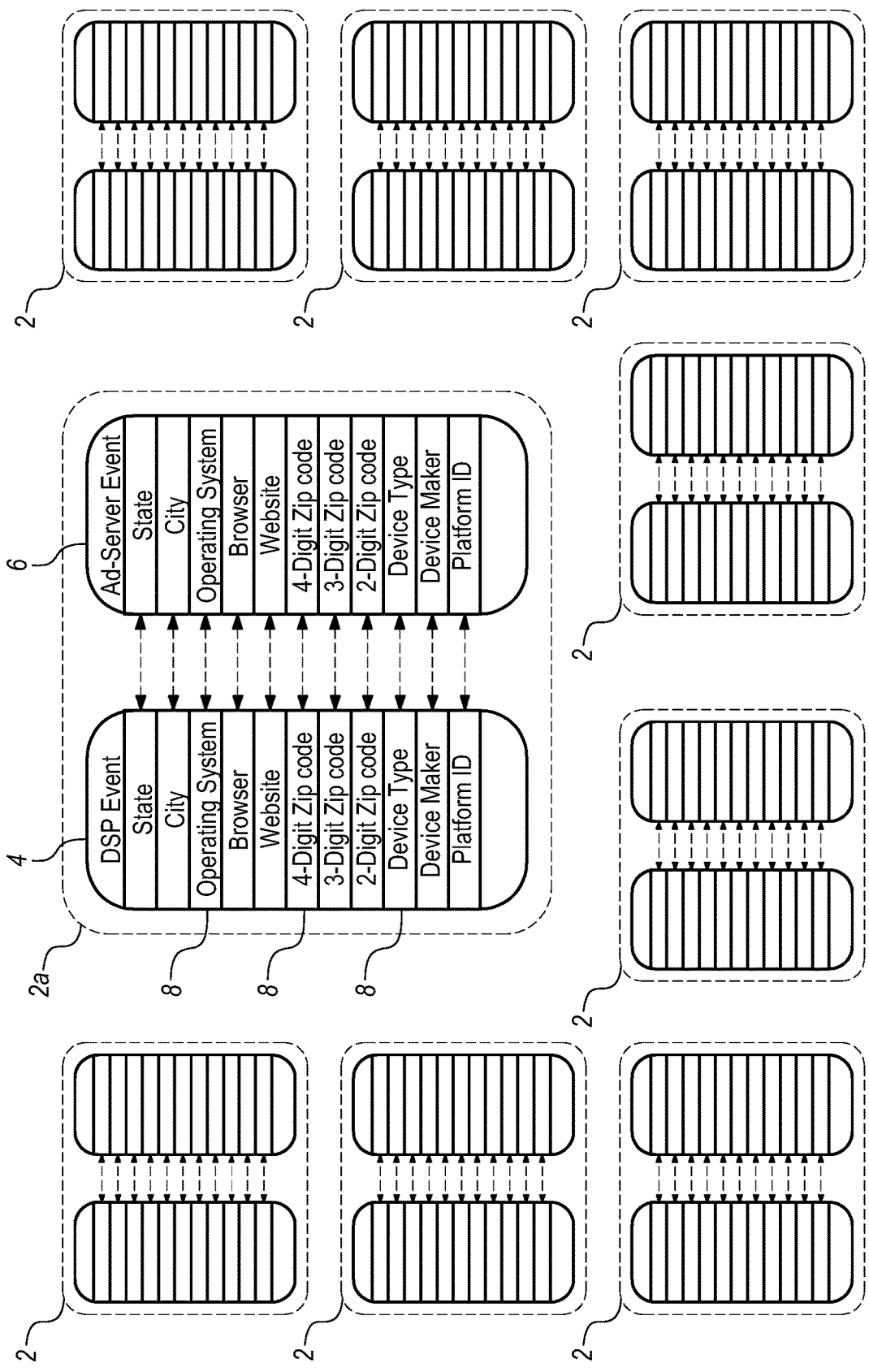
FIG. 1 is a diagram representing DSP Event and Ad-Server event pairs, showing example source fields (state, city, operating system, etc.) for each event of the event pair.

Generally speaking, the present invention in certain implementations is directed to a system and method for matching corresponding DSP log events 4 and Ad Server log events 6 associated with a single real-world impression, as shown in the figures. The invention utilizes a series of steps to create and quantify two novel factors (independent geographic closeness factor and the sole rightful heir factor) from the event log data 4, 6 and applies a probability analysis to those factors to determine whether a particular DSP log-Ad server pair 2a is a Match (meaning that both the DSP log event 4 and Ad Server log event 6 of the particular pair 2a do, in fact, correspond to the same real-world impression) or an Unmatch (meaning that the pair 2a does not correspond to the same real-world impression). Generally speaking, the invention in certain implementations includes the following broad steps: (a) log events from both data sources are segregated into smaller unit groups corresponding to individual advertisers and to discrete, identifiable units within each advertiser's overall strategy, (b) a time-difference window $W_T$ is defined, within which most Match pairs are expected to fall, (c) DSP-Ad Sever candidate Pairs 2 (which may be referred to herein simply as "Pairs") that fall within the time-difference window $W_T$ are created for each group, (d) data fields 7 of the Pairs 2 are compared to create a row of two-valued Pair Attributes for each Pair 2, (e) for each row of two-valued Pair Attributes, the probability that the two events correspond to the same impression is determined, and (f) the pairwise match probabilities produced in step (e) are compared for every potential matching pair and the sole-rightful-heir factor sorts candidate pairs into Match and Unmatch. One or more of these steps may be modified, eliminated, or substituted depending on the user's desired use, and it is understood that one or more of these steps may have a series of sub-steps that achieve the goal of the particular step, as described more fully below. In any event, this general method is utilized by the invention in certain implementations to determine whether a Pair is a Match or an Unmatch.

As noted above, the preferred first step in determining whether a particular Pair 2a is a Match or an Unmatch (and thus whether the Pair 2a does or does not correspond to the same real-world impression) is reducing the search space by segregating events into unit groups and then applying a filter that keeps only those pairs that fall within the time-difference window $W_T$ for further analysis. These two steps enable creating the candidate Pairs 2 to be analyzed. In this regard, the invention uses a mix of deterministic and probabilistic record matching, starting with events recorded over a short time period (preferably twenty-four hours) in both the Ad Server and DSP logs. This filtering function reduces the field of pairs into a more manageable field of candidate pairs by segregating all events from the Ad Server's log during a selected time period (for example, twenty-four hours) and all events from the DSP's log during the same time period into "unit groups" corresponding to individual advertisers and to discrete units within each advertiser's larger strategy using certain identifying values in the log data. A time-difference window $W_T$ is defined, the time-difference window identifying a window of time in which most Match pairs are expected to fall. A comparison of every event from the Ad Server's log in a given unit group with every event from the DSP's log in the same unit group is performed and all pairs that do not fall within the time-difference window $W_T$ are filtered out (as they are most unlikely to be Match pairs). This creates a series of candidate Paris, and the field values of the other source fields are compared for all of the candidate Pairs. At this stage, the Pairs 2 are either a Match or an Unmatch, but such classification is not known until the remaining portion of the implementation is utilized to make that determination. A diagram showing examples of these Pairs 2 is shown in FIG. 1.

Figure 4:
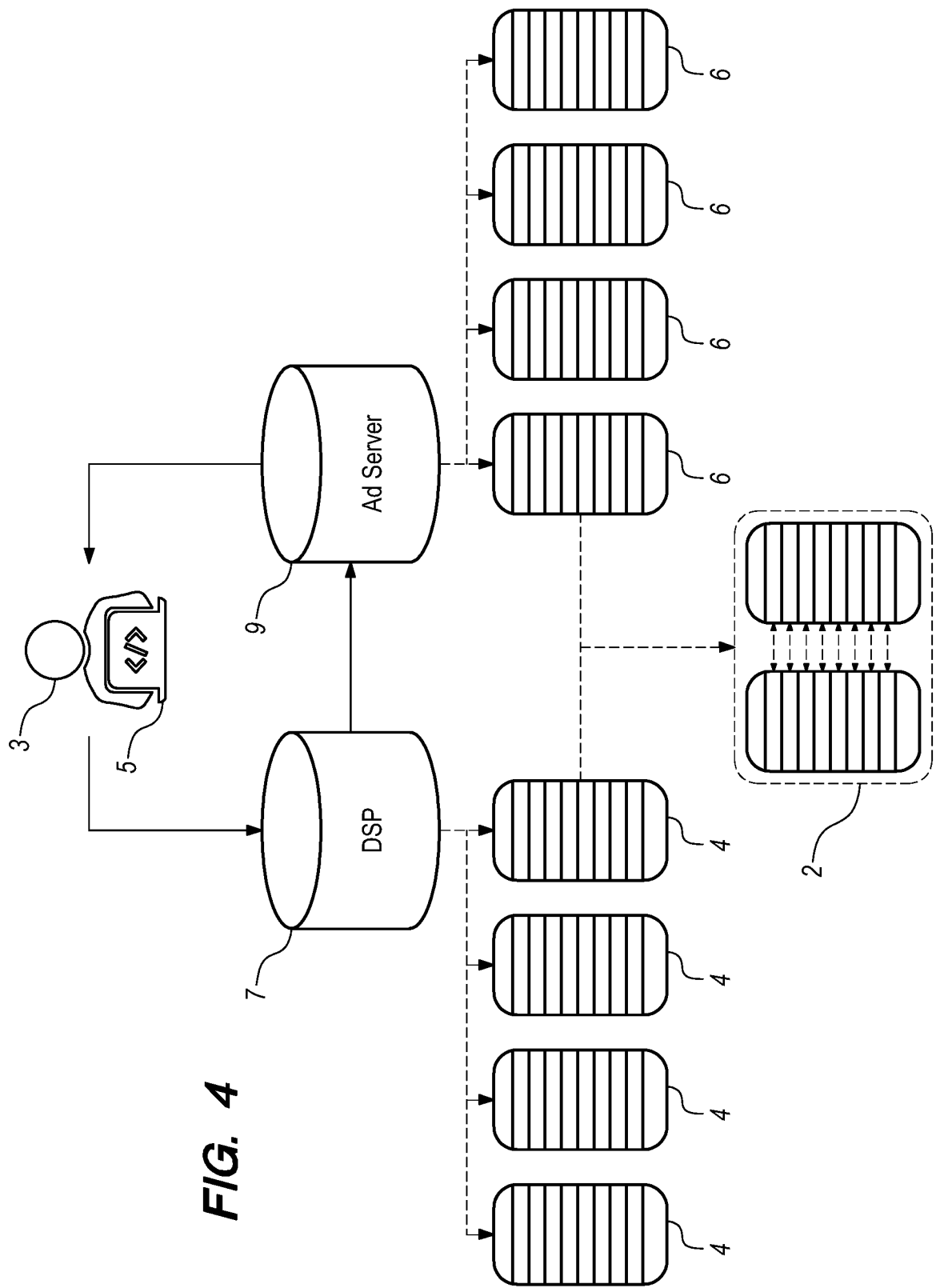
FIG. 4 is a diagram showing the system of the present invention including the consumer, the DSP and its event log data, the Ad Server and its event log data, and the combination of DSP event data and Ad Server event data into a DSP-Ad Server Pair.
Figure 5:
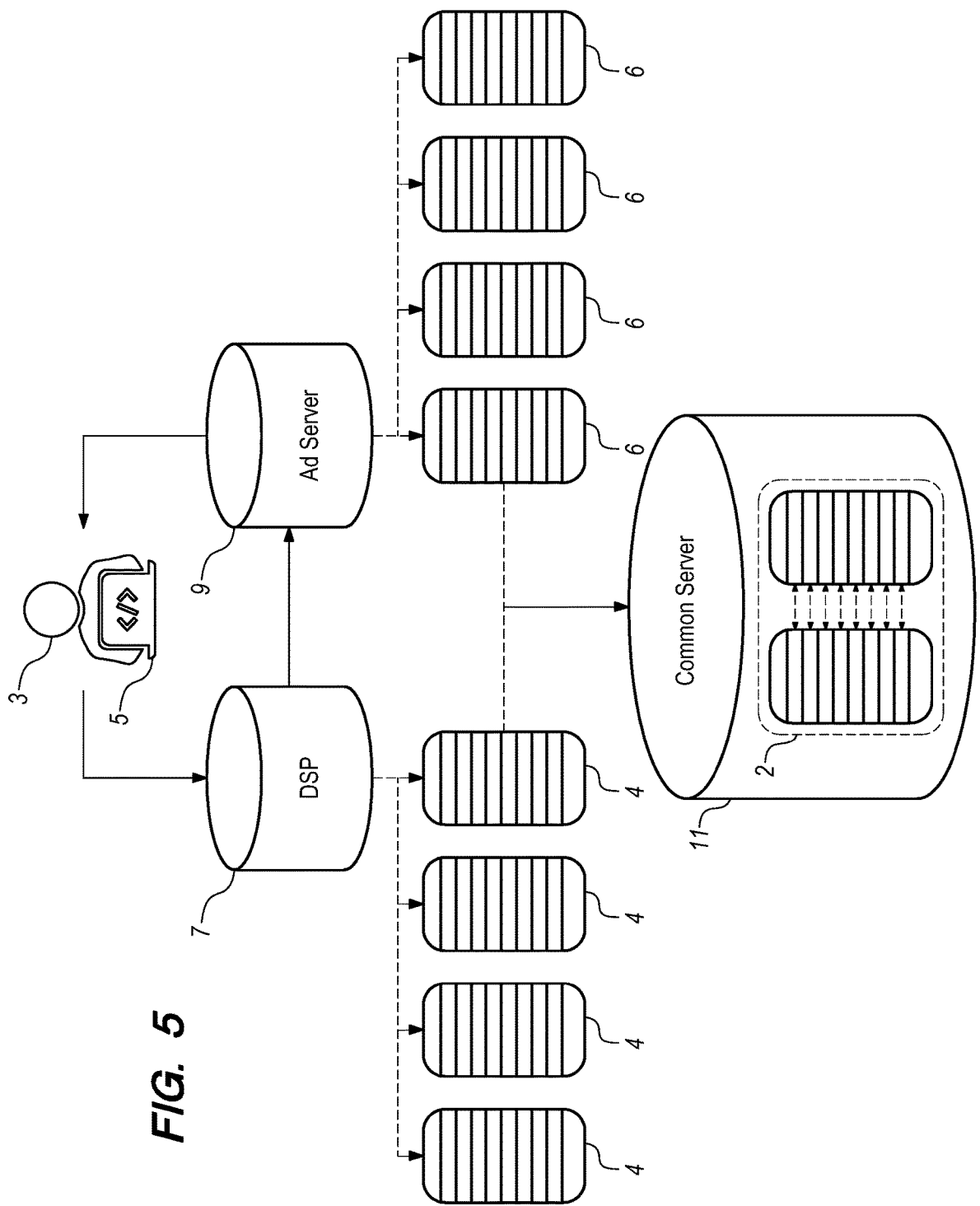
FIG. 5 is a modification to FIG. 4 showing the inclusion of a Common Server.

As noted previously, the DSP event logs 4 and Ad-Server event logs 6 to be paired 4 and compared for matching are generated by a demand service provider (DSP) 7 and Ad Server 9, respectively, as shown in FIG. 4. These event logs 4, 6 contain data associated with ad-serve events, or the digital display of advertisements to users 3 on user devices 5 (otherwise known as "impressions"). In this regard, the system and method of the present invention can be utilized within existing ad-serve technological environments (such as those that use real time bidding technology such as DSPs and SSPs over an ad network) to improve the tracking and identification of digital consumer activity without violating the privacy of any such consumers. To create the event log data sets 4, 6 for which the present invention is utilized, digital users 3 access the internet from user devices 5 (which may, for example, incorporate a browser or other content-viewing application), and when a user 3 views an eligible display space on the user device 5, the DSP 7 processes bids for the ad display on behalf of advertisers and the Ad Server 9 then delivers the ad to the user's device 5. Each of these generates log data 4, 6 for the event, and, of course, this happens for multiple ad events associated with multiple different users 3. These event logs 4, 6 may be stored in a database and may, in one embodiment, be stored or transferred to a common server 11 (as shown, for example, in FIG. 5), where the record matching of the present invention is utilized to compare the event logs 4, 6 to determine which of the pairs 2 are truly Matches.

Each event 4, 6 from each source set has associated with it a series of data values that are associated with specific data fields 8. For example, both data sets report geographic location (state, city, zip code, etc.), time, the website where the ad was delivered, and a number of other data values for each impression event 4, 6. The two data sets 4, 6 contain many differing such fields, but the preferred implementation focuses on comparing those that appear to be "like for like," which may include, for example, the following: (a) the timestamp of the impression event, (b) the state in which the user was physically located for the impression event, (c) the metro area in which the user was physically located for the impression event, (d) the city in which the user was physically located for the impression event, (e) the 5-digit zip code in which the user was physically located for the impression event, (f) the operating system being used by the user, (g) the browser being used by the user, and (g) the site on which the ad was delivered, as shown, for example, in FIGS. 1-2. Each of these fields may be referred to as a "source field," and comparing the source fields 8 (as shown for example, in FIG. 2) for each Pair 2 creates a row of "pair fields" corresponding to each such Pair 2. Most of the pair fields will be two-valued and will include (i) a simple Boolean variable indicating whether the individual source fields are direct matches (as described more fully below and as shown, for example, in the diagram of FIG. 2 and the table in FIG. 3), and (ii) the value on which the source fields match, if they do indeed match.

For all pairs in a given unit group that fall within the time-difference window $W_T$, the source fields 8 (for example, those listed above, or other similar fields) of each of the two individual events in each Pair 2 are compared to create Pair Attributes for each such Pair 2. The Pair Attributes may include both a Boolean value indicating whether the values in each of the corresponding source fields 8 is the same or different, as shown for example in FIG. 2. One value (such as a "1", for example) for the Boolean value of the Pair Attribute indicates that the values in the corresponding source fields 8 of a Pair 2 match, while a second value (such as a "0" for example) would indicate that the values in the corresponding source fields 8 do not match. In the case of a source field match, the second part of the Pair Attribute indicates the value on which the two source fields match. In the case of the source field not matching, the second part of the Pair Attribute is simply "null."

A data matrix is thus formed with one axis (such as the rows) corresponding to a single candidate Pair 2 and the other axis (for example the columns) providing the Pair Attributes, which as noted above, may include (a) Boolean values representing whether the values in the given source fields 8 in the individual logs match (as indicated by a "1") or do not match (as indicated by a "0") and (b) the value on which any such source field match occurs. An example of such a matrix is provided in FIG. 3. It should be noted, of course, that this matching of values in the source fields 8 (i.e., two events happened in the same city or on the same type of device) is not the same as the ultimate determination whether the Pairs 2 themselves are a Match or an Unmatch (i.e. correspond to the same ad-serve event or not). While the match/unmatch nature of the source field 8 values are preferably denoted by Boolean values 1 and 0, the Match/Unmatch classification of Pairs 2 themselves may be denoted by different values, such as M (for Match) and U (for Unmatch) for purposes of describing the invention with clarity. In the case where the concept of the real-world match (or not-match) of the information represented by a single field for a given pair must be considered separately from the field values reported by the two event logs either matching or not (a 1 or a 0), lower case "match" and "unmatch," or "m" and "u" may be utilized for clarity.

Figure 2:
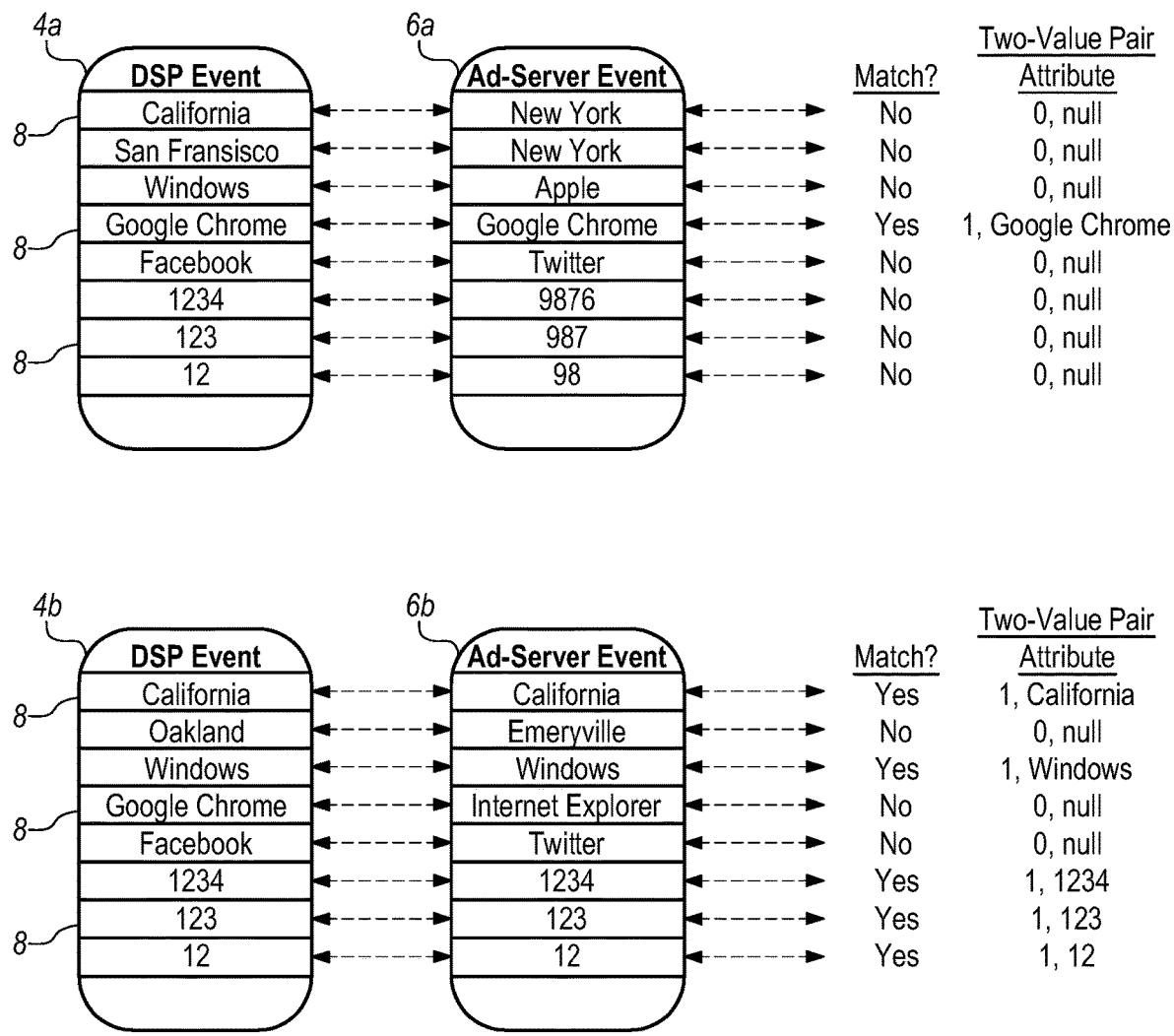
FIG. 2 is a diagram representing the comparison of the field data in each of the example source fields for a paired DSP Event and Ad-Server Event, indicating whether the field data in each source field is a match and assigning a two-value Pair Attribute based on whether the field data is matches.
Figures 3, 3A:
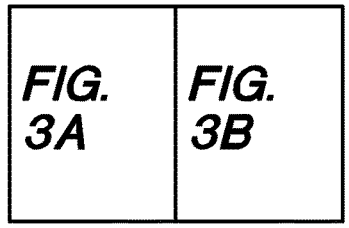
FIG. 3 is a table showing a number of event data sets and associated source fields, which are assigned two-value Pair Attributes based on the field data match or field data unmatch of the data in the associated source field and wherein the two-value Pair Attributes are organized into a data matrix.

As shown in FIG. 3, the matrix may include a number of columns corresponding to the number of source fields 8 compared for each of the events in a source set. As shown in column four, for example, the values "1" or "0" indicate whether the state in which the user was physically located for the impression event was the same or different for each of the Pairs 2. As shown, the first Pair (which corresponds with the values shown in row 1) has a "State Match column" value of 0, indicating that the Ad-Server event and DSP event reported different states (an example is shown in FIG. 2, where the top pair the DSP event data shows the state of California and the Ad Server event data shows the state of New York—no match). For purposes of the preferred embodiment, the values in the various source fields are said to match ("1") if the following are found to be true: (b) the states reported by the Ad Server event and the DSP event are the same, (c) the metro reported by the Ad Server event and the DSP event are the same, (d) the city reported by the Ad Server event and the DSP event are the same, (e) the zip codes, and separately the first 4, 3, and 2 digits of the zip codes, reported by the Ad Server event and the DSP event are the same, (f) the operating systems reported by the Ad Server event and the DSP event are the same, (g) the browsers reported by the Ad Server event and the DSP event are the same, and (h) the sites reported by the Ad Server event and the DSP event are the same. From each such row of Pair attributes, the probability that two events forming the Pair correspond to the same real-world event of a user being delivered an impression (i.e. whether the Pair 2 is a Match or Unmatch) can be determined.

The Bayesian analysis of the present invention utilizes the principles of Bayes' Theorem, which provides the following:

$$P(H \mid E) = \frac{P(E \mid H) \times P(H)}{P(E)},$$

for $H$ = hypothesis and $E$ = evidence

For the present invention, the hypothesis for each Pair is the state "Match," represented with a capital "M" (and where necessary "Unmatch" is represented with a capital "U"). The evidence (E) that is used to inform about the truth or falsity of the hypothesis (that a selected Pair is a Match) consists of the row of Pair Attribute values corresponding to that Pair, as portrayed in the example table shown in FIG. 3. For each Pair the question is "what is the probability that the two log events in this pair represent the same real-world event, given the values that make up the pair attributes associated with this pair?," or, put in terms of Bayes' Theorem, "what is P(H|E)?" For each Pair, then, the above equation is considered in the following terms:

$$P(M \mid E) = 1 - P(U \mid E) = 1 - \frac{P(E \mid U) \times P(U)}{P(E)} \text{ for} \quad \text{(Equation 1)}$$

$M$ = Match and for $E$ = set of Comparison field values $\{e_i\}$

This equation may be referred to as Equation 1. Every Pair is either a Match or an Unmatch, from which we know that P(M|E)=1−P(U|E). The three terms appearing on the right side of Equation 1 are discussed more fully below.

First the term P(E|U) can be discussed in detail. While the present invention does consider whether the Pairs are a Match given the entire row of values (E={$e_1$, $e_2$, . . . , $e_n$}) for all Comparison Fields, the Comparison Fields must first be analyzed individually (the individual $e_i$ values). Assuming that the $e_i$ are independent of one another, then this relationship can be expressed by the probability corresponding to the entire row P(M|E) equaling the product of the individual probabilities P(M|$e_i$) for each Comparison Field value in that row:

$$P(E|U) = \Pi_{i=1}^{e_i \in E} P(e_i | U) \quad \text{(Equation 2)}$$

assuming the $e_i$ are all pairwise independent. There is one large exception to this independence condition: because the four geographic Comparison Fields (State, Metro, City, Zip) are not independent of one another, they must be combined into a single aggregate Comparison Field that both (a) is independent of the other $e_i$ in Equation 2, and (b) preserves the information contained in the four geographic $e_i$. This single aggregate geographic Comparison Field (which is referred to as $e_G$) is then included among the $e_i$ in place of the four previous geographic fields, and along with the non-geographic Comparison Fields, in the product of Equation 2:

$$P(E|U) = P(e_G|U) \times \Pi_{i=1}^{e_i \in E, \notin G} P(e_i | U) \quad \text{(Equation 3)}$$

for G=set of 4 geographic Comparison Fields and for $e_G$=vector of 4 geographic fields Region, Metro, City, Zip This equation is referred to as Equation 3, which is merely a special case of Equation 2, where the probability corresponding to $e_G$ is written out separately. This could be equivalently expressed accurately in the form of Equation 2, inserting $e_G$ as one of the $e_i$.

$P(e_G|U)$ can be defined in terms of its constituent fields, as shown in Equation 4 below:

$$P(e_G|U) = P(e_R|U) \times P(e_M|e_R \cap U) \times P(e_C|e_M \cap e_R \cap U) \times P(e_Z|e_C \cap e_M \cap e_R \cap U) \quad \text{(Equation 4)}$$

Definitions for the expansion of Equation 4 terms are shown below:

$e_G = [e_R, e_M, e_C, e_Z]$
$e_R = 1(\text{DCM Region} = \text{TTD Region})$, a binary indicator of the Region fields in a Pair matching
$E_M = 1(\text{DCM Metro} = \text{TTD Metro})$
$e_C = 1(\text{DCM City} = \text{TTD City})$
$e_Z = 1(\text{DCM Zip} = \text{TTD Zip})$
R=region value in a single Source Event
M=metro value in a single Source Event
C=city value in a single Source Event
Z=zip value in a single Source Event
RM=vector of region and metro values in a single Source Event,
  such as [California, San Francisco Bay Area]
RMC=vector of region, metro and city values in a single Source Event,
  such as [California, San Francisco Bay Area, Emeryville]
R2=vector containing the R for both Source Events region in a Pair,
  such as [California, Texas]
RM2=vector containing the RM for both Source Events in a Pair,
  such as [California, San Francisco Bay Area, Texas, Dallas Ft. Worth]
RMC2=vector containing the RMC for both Source Events in a Pair,
  such as [California, San Francisco Bay Area, Emeryville, Tex., Dallas Ft. Worth, Arlington]
$i_k$=where i indicates a pairwise vector such as RR, the value from the $k^{th}$ Set's Event comprising i,
  such as the DCM Source Event's R value in RR Expansion of Equation 4 terms is discussed below. First, $P(e_R|U)$ can be defined for two possible cases:

$$P(e_R = 1 | U) = \sum_{R:i=1}^{n} \prod_{Set:j=1}^{2} \frac{\text{\#Events in Set } j \text{ with } R = i}{\text{\#Events in Set } j} \quad \text{Case A1}$$

for $n$ unique values of $R$.

$$P(e_R = 0 | U) = 1 - P(e_R = 1 | U) \quad \text{Case A2}$$

And $P(e_M|e_R \cap U)$ can be defined for 4 possible cases:

$$P(e_M = 1 | e_R = 1 \cap U) = \sum_{R:i=1}^{n} \left[ \frac{\text{\# Pairs with } e_R = 1, R = i}{\text{\# Pairs with } e_R = 1} \times \right.$$
$$\left. \sum_{M:j=1}^{m} \prod_{Set:k=1}^{2} \frac{\text{\# Events in Set } k \text{ with } R = i, M = j}{\text{\# Events in Set } k \text{ with } R = i} \right] \quad \text{Case B1}$$

for $n$ unique values of $R$; $m$ unique values of $M$.

$$P(e_M = 0 | e_R = 1 \cap U) = 1 - P(e_M = 1 | e_R = 1 \cap U) \quad \text{Case B2}$$

$$P(e_M = 1 | e_R = 0 \cap U) = \sum_{R:i=1}^{n} \left[ \frac{\text{\# Pairs with } e_R = 0, RR = i}{\text{\# Pairs with } e_R = 0} \times \right.$$
$$\left. \sum_{M:j=1}^{m} \prod_{Set:k=1}^{2} \frac{\text{\# Events in Set } k \text{ with } R = i_k, M = j}{\text{\# Events in Set } k \text{ with } R = i_k} \right] \quad \text{Case B3}$$

for $n$ unique values of $RR$ in pairs with $e_R = 0$;
$m$ unique values of $M$.

$$P(e_M = 0 | e_R = 0 \cap U) = 1 - P(e_M = 1 | e_R = 0 \cap U) \quad \text{Case B4}$$

And $P(e_C|e_R \cap e_M \cap U)$ can be defined for 8 possible cases:

$$P(e_C = 1 | e_R = 1 \cap e_M = 1 \cap U) = \quad \text{Case C1}$$
$$\sum_{RM:i=1}^{n} \left[ \frac{\text{\# Pairs with } e_R = 1, e_M = 1, RM = i}{\text{Pairs with } e_R = 1, e_M = 1} \times \right.$$
$$\left. \sum_{j=1}^{m} \prod_{k=1}^{2} \frac{\text{\# Events in Set } k \text{ with } RM = i, C = j}{\text{\# Events in Set } k \text{ with } RM = i} \right]$$

for $n$ unique values of $RM$ in Pairs with $e_R = 1$, $e_M = 1$; $m$ unique values of $C$.

$$P(e_C = 0 | e_R = 1 \cap e_M = 1 \cap U) = \quad \text{Case C2}$$
$$1 - P(e_C = 1 | e_R = 1 \cap e_M = 1 \cap U)$$
$$1 - P(e_C = 1 | e_R = 1 \cap e_M = 1 \cap U)$$

$$P(e_C = 1 | e_R = 1 \cap e_M = 0 \cap U) = \quad \text{Case C3}$$
$$\sum_{RM2:i=1}^{n} \left[ \frac{\text{\# Pairs with } e_R = 1, e_M = 0, RMRM = i}{\text{Pairs with } e_R = 1, e_M = 0} \times \right.$$
$$\left. \sum_{C:j=1}^{m} \prod_{Set:k=1}^{2} \frac{\text{\# Events in Set } k \text{ with } RMRM = i, C = j}{\text{\# Events in Set } k \text{ with } RMRM = i} \right]$$

$$P(e_C = 0 | e_R = 1 \cap e_M = 0 \cap U) = \quad \text{Case C4}$$
$$1 - P(e_C = 1 | e_R = 1 \cap e_M = 0 \cap U)$$

$$P(e_C = 1 | e_R = 0 \cap e_M = 1 \cap U) = \quad \text{Case C5}$$
$$\sum_{RM2:i=1}^{n} \left[ \frac{\text{\# Pairs with } e_R = 0, e_M = 1, RMRM = i}{\text{Pairs with } e_R = 0, e_M = 1} \times \right.$$
$$\left. \sum_{C:j=1}^{m} \prod_{Set:k=1}^{2} \frac{\text{\# Events in Set } k \text{ with } RMRM = i, C = j}{\text{\# Events in Set } k \text{ with } RMRM = i} \right]$$

$$P(e_C = 0 | e_R = 0 \cap e_M = 1 \cap U) = \quad \text{Case C6}$$
$$1 - P(e_C = 1 | e_R = 0 \cap e_M = 1 \cap U)$$

$P(e_C = 1 \mid e_R = 0 \cap e_M = 0 \cap U) =$ Case C7

$$\sum_{RM2:i=1}^{n} \left[ \frac{\text{\# Pairs with } e_R = 0, e_M = 0, RMRM = i}{\text{Pairs with } e_R = 0, e_M = 0} \times \sum_{C:j=1}^{2} \prod_{Set:k=1}^{m} \frac{\text{\# Events in Set } k \text{ with } RMRM = i, C = j}{\text{\# Events in Set } k \text{ with } RMRM = i} \right]$$

$P(e_C = 0 \mid e_R = 0 \cap e_M = 0 \cap U) =$ Case C8
$1 - P(e_C = 1 \mid e_R = 0 \cap e_M = 0 \cap U)$ In addition, $P(e_Z \mid e_R \cap e_M \cap e_C \cap U)$ defined for 16 possible cases:

$P(e_Z = 1 \mid e_R = 1 \cap e_M = 1 \cap e_C = 1 \cap U) =$ Case D1

$$\sum_{RMC:i=1}^{n} \left[ \frac{\text{\# Pairs with } e_R = 1, e_M = 1, e_C = 1, RMC = i}{\text{\# Pairs with } e_R = 1, e_M = 1, e_C = 1} \times \sum_{Z:j=1}^{2} \prod_{Set:k=1}^{m} \frac{\text{\# Events in Set } k \text{ with } RMC = i, Z = j}{\text{\# Events in Set } k \text{ with } RMC = i} \right]$$

$P(e_Z = 0 \mid e_R = 1 \cap e_M = 1 \cap e_C = 1 \cap U) =$ Case D2
$1 - P(e_Z = 1 \mid e_R = 1 \cap e_M = 1 \cap e_C = 1 \cap U)$ $P(e_Z = 1 \mid e_R = 0 \cap e_M = 1 \cap e_C = 1 \cap U) =$ Case D3

$$\sum_{RMC2:i=1}^{n} \left[ \frac{\text{\# Pairs with } e_R = 0, e_M = 1, e_C = 1, RMC2 = i}{\text{\# Pairs with } e_R = 0, e_M = 1, e_C = 1} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 0 \cap e_M = 1 \cap e_C = 1 \cap U) =$ Case D4
$1 - P(e_Z = 1 \mid e_R = 0 \cap e_M = 1 \cap e_C = 1 \cap U)$ $P(e_Z = 1 \mid e_R = 1 \cap e_M = 0 \cap e_C = 1 \cap U) =$ Case D5

$$\sum_{RMC2:i=1}^{n} \left[ \frac{\text{\# Pairs with } e_R = 1, e_M = 0, e_C = 1, RMC2 = i}{\text{\# Pairs with } e_R = 1, e_M = 0, e_C = 1} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 1 \cap e_M = 0 \cap e_C = 1 \cap U) =$ Case D6
$1 - P(e_Z = 1 \mid e_R = 1 \cap e_M = 0 \cap e_C = 1 \cap U)$ $P(e_Z = 1 \mid e_R = 1 \cap e_M = 1 \cap e_C = 0 \cap U) =$ Case D7

$$\sum_{RMC2:i=1}^{n} \left[ \frac{\text{\# Pairs with } e_R = 1, e_M = 1, e_C = 0, RMC2 = i}{\text{\# Pairs with } e_R = 1, e_M = 1, e_C = 0} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 1 \cap e_M = 1 \cap e_C = 0 \cap U) =$ Case D8
$1 - P(e_Z = 1 \mid e_R = 1 \cap e_M = 1 \cap e_C = 0 \cap U)$ $P(e_Z = 1 \mid e_R = 1 \cap e_M = 0 \cap e_C = 0 \cap U) =$ Case D9

$$\sum_{RMC2:i=1}^{n} \left[ \frac{\text{\# Pairs with } e_R = 1, e_M = 0, e_C = 0, RMC2 = i}{\text{\# Pairs with } e_R = 1, e_M = 0, e_C = 0} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 1 \cap e_M = 0 \cap e_C = 1 \cap U) =$ Case D10
$1 - P(e_Z = 1 \mid e_R = 1 \cap e_M = \cap e_C = 1 \cap U)$ $P(e_Z = 1 \mid e_R = 0 \cap e_M = 1 \cap e_C = 0 \cap U) =$ Case D11

$$\sum_{RMC2:i=1}^{n} \left[ \frac{\text{\# Pairs with } e_R = 0, e_M = 1, e_C = 0, RMC2 = i}{\text{\# Pairs with } e_R = 0, e_M = 1, e_C = 0} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 0 \cap e_M = 1 \cap e_C = 0 \cap U) =$ Case D12
$1 - P(e_Z = 1 \mid e_R = 0 \cap e_M = 1 \cap e_C = 0 \cap U)$ $P(e_Z = 1 \mid e_R = 0 \cap e_M = 0 \cap e_C = 1 \cap U) =$ Case D13

$$\sum_{RMC2:i=1}^{n} \left[ \frac{\text{\# Pairs with } e_R = 0, e_M = 0, e_C = 1, RMC2 = i}{\text{\# Pairs with } e_R = 0, e_M = 0, e_C = 1} \times \sum_{Z:j=1}^{2} \prod_{Set:k=1}^{m} \frac{\text{\# Events in Set } k \text{ with } RMC = i_k, Z = j}{\text{\# Events in Set } k \text{ with } RMC = i_k} \right]$$

$P(e_Z = 0 \mid e_R = 0 \cap e_M = 0 \cap e_C = 1 \cap U) =$ Case D14
$1 - P(e_Z = 1 \mid e_R = 0 \cap e_M = 0 \cap e_C = 1 \cap U)$ -continued $$P(e_Z = 1 \mid e_R = 0 \cap e_M = 0 \cap e_C = 0 \cap U) = \quad \text{Case D15}$$

$$\sum_{RMC2:i=1}^{n} \left[ \frac{\text{\# Pairs with } e_R = 0, e_M = 0, e_C = 0, RMC2 = i}{\text{\# Pairs with } e_R = 0, e_M = 0, e_C = 0} \times \right.$$

$$\left. \sum_{Z:j=1}^{m} \prod_{Set:k=1}^{2} \frac{\text{\# Events in Set } k \text{ with } RMC = i_k, Z = j}{\text{\# Events in Set } k \text{ with } RMC = i_k} \right]$$

$$P(e_Z = 0 \mid e_R = 0 \cap e_M = 0 \cap e_C = 0 \cap U) = \quad \text{Case D16}$$
$$1 - P(e_Z = 1 \mid e_R = 0 \cap e_M = 0 \cap e_C = 0 \cap U)$$

$P(E_G|U)$ can be calculated for each of 16 possible $E_G$ vectors by first creating a 16 row×10 column data structure PEgDf, as shown, for example below:

| EgIndex | er | em | ec | ez | PrU | PmrU | PcrmU | PzrmcU | PEgU |
|---|---|---|---|---|---|---|---|---|---|
| 1 | 1 | 1 | 1 | 1 | A1 | B1 | C1 | | D1 |
| 2 | 1 | 1 | 1 | 0 | A1 | B1 | C1 | | D2 |
| 3 | 1 | 1 | 0 | 1 | A1 | B1 | C2 | | D3 |
| 4 | 1 | 1 | 0 | 0 | A1 | B1 | C2 | | D4 |
| 5 | 1 | 0 | 1 | 1 | A1 | B2 | C3 | | D5 |
| 6 | 1 | 0 | 1 | 0 | A1 | B2 | C3 | | D6 |
| 7 | 1 | 0 | 0 | 1 | A1 | B2 | C4 | | D7 |
| 8 | 1 | 0 | 0 | 0 | A1 | B2 | C4 | | D8 |
| 9 | 0 | 1 | 1 | 1 | A2 | B3 | C5 | | D9 |
| 10 | 0 | 1 | 1 | 0 | A2 | B3 | C5 | | D10 |
| 11 | 0 | 1 | 0 | 1 | A2 | B3 | C6 | | D11 |
| 12 | 0 | 1 | 0 | 0 | A2 | B3 | C6 | | D12 |
| 13 | 0 | 0 | 1 | 1 | A2 | B4 | C7 | | D13 |
| 14 | 0 | 0 | 1 | 0 | A2 | B4 | C7 | | D14 |
| 15 | 0 | 0 | 0 | 1 | A2 | B4 | C8 | | D15 |
| 16 | 0 | 0 | 0 | 0 | A2 | B4 | C8 | | D16 |

The first five columns (EgIndex, er, em, ec, and ez) simply list out and index the sixteen possible combinations of the four binary variables that make up $e_G$. The formulae for calculating the values that go in columns six through nine (PrU, PmrU, PcrmU, and PzrmcU) are provided above. The values provided in the table reference the appropriate equation from above that is used. For example, A1 refers to the equation provided in Case A1 above, while B4 refers to the equation provided in Case B4 discussed above. The last column equals the product of the values in columns six through nine. For the above calculations, $P(e_i=1|U)$ is defined for each Pair Field i as shown in Equation 5:

$$P(e_i = 1 \mid U) = \quad \text{(Equation 5)}$$

$$\sum_{k=1}^{n} \text{frequency of value } k \text{ in source set 1,}$$

field $i \times$ frequency of value $k$ in source set 2, field $i$ over the $n$ unique values appearing in field $i$ over both source sets.

P(U) is the probability of the Pair in question being an Unmatch, with no additional information or condition, with a frequentist approach. Over a large data set, this will equate to the number of real-world Match Pairs divided by the total number of Pairs considered. The number of un-matches in every unit group should be known because it is known that each source event belongs to exactly one Match Pair. Therefore:

$$P(U) = 1 - \frac{\text{number of Matches in unit group}}{\text{number of Pairs in group}} =$$

$$\frac{\text{number of events in smaller source set}}{\text{number of events in smaller source set} \times \text{number of events in larger source set}} =$$

$$\frac{1}{\text{number of events in larger source set}}$$

The above Bayesian inference allows for the calculation of a probability of Match for an individual Pair based solely on the row of Pair Fields corresponding to the two events that make up that Pair. The probability value it produces (P1) is the best estimate based solely on that information. It is understood, however, that for each event from the smaller Source Set, precisely one Pair including that event will be a Match in the real-world sense (the set of all such Pairs including the same event may be referred to as a "Pair Cohort"). Therefore:

$$\sum_{j=1}^{n} P(pair_{i,j} \text{ is Match}) = 1$$

$$\text{for} \begin{cases} pair_{i,j} = \text{the pair of Event } i \text{ from small Source Set and Event } j \text{ from large Source Set} \\ i = \text{indicator of single event from smalller Source Set} \\ n = \text{number of Events in larger Source Set} \end{cases}$$

This property is reflected in part in the prior probability $P(H)=P(M)=P3$ in the Bayesian analysis. The Bayesian analysis does not reflect, however, that precisely one of the Pairs corresponding to each Event is a Match and all of the others are not. The single row for each Event demonstrating the highest P1 value can be selected and designated as the single Match among all rows corresponding to that Event. More precisely, the probability measure can be calculated with the following equation $P1^* = P(M|P1$ and precisely one pair is $M$ for all Pairs incorporating a single Event)

This value equals the following, referred to as Equation 6:

$$\frac{P1_i \times \prod_{j \neq i}(1-P1_j)}{P1_i \times \prod_{j \neq i}(1-P1_j) + \sum_{j \neq i}\left(P1_j \times \prod_{k \neq j}[(1-P1_k))\right]} = P1_i \times \frac{\prod_{j \neq i}(1-P1_j)}{P1_i \times \prod_{j \neq i}(1-P1_j) + \sum_{j \neq i}\left(P1_j \times \prod_{k \neq j}[(1-P1_k))\right]} = P1_i^*.$$

where $P1_i$ is the P1 value of the Pair in question, $j \neq i$ denotes all Pairs in the same Pair Cohort as Pair i other than Pair i, and $k \neq j$ denotes all Pairs in the same Pair Cohort as Pair i other than Pair j and including Pair i.

This is the probability of the state that the given Pair is a Match, by P1, while all other Pairs including the given event from the smaller source set are Unmatch, also by P1, as a proportion of the state space that is the sum of all states where exactly one Pair from the Pair Cohort is a Match. Within each Pair Cohort, P1* values will migrate toward 1 and 0 from P1 values, which will make Match pairs stand out (they will migrate toward 1 while all other pairs migrate toward 0), and will make determining when errors in the data exclude a Match for a given event (because P1* for the "strongest" candidate pair in a Pair Cohort will not migrate toward 1 as strongly as expected).

The quantity $$\frac{\prod_{j \neq i}(1-P1_j)}{P1_i \times \prod_{j \neq i}(1-P1_j) + \sum_{j \neq i}\left(P1_j \times \prod_{k \neq j}[(1-P1_k))\right]}$$

from Equation 6 may be referred to as the "Sole Rightful Heir Factor" and it can be simplified as:

$(\Pi\_(j \neq i) \equiv [ (1-P1\_j) ])/(\Sigma\_(l=1)\hat{} n \equiv [ P1\_l \times \Pi\_(m \neq l) \equiv [ (1-P1\_m)) ])$ where $j \neq i$ still denotes all Pairs in Pair i's Pair Cohort other than Pair i, n is the total number of Pairs in the Pair Cohort, l is the index for all Pairs in such Pair Cohort.

The above calculation gives a probability value for each Pair being a Match, but it must be determined what level of such probability should cause such Pair to be treated as a Match versus an Unmatch. Such level is called the "Decision Threshold." The migration of P1* toward extreme values will enhance the ability to select a reliable Decision Threshold by creating a wider "street" separating "high" P1* values for each Small Source event from "low" values. A simple supervised clustering classification model like K-means, trained on the P1* values, will thus produce a robust boundary between such values and allow determination of a confidence level in the Match and Unmatch determinations.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method for accurately matching corresponding demand-side platform DSP event data and Ad-Server event data associated with a single real-world ad serve event, the method comprising the steps of:
   a. at a common server, receiving from the DSP a set of DSP event data from a DSP source set, each piece of DSP event data comprising a series of DSP source fields having a field data value and wherein at least two of the DSP event data are DSP geographic event data;

b. at the common server, receiving from an ad server a set of Ad-Server event data from an Ad-Server source set, each piece of Ad-Server event data comprising a series of Ad-Server source fields having a field data value and wherein at least two of the Ad-Server event data are Ad-Server geographic event data;

c. combining each piece of DSP geographic event data into a combined DSP comparison field, combining each piece of Ad-Server event data into a combined Ad-Server comparison field, and pairing each piece of DSP event data with each piece of Ad-Server event data to create a data matrix stored at the common server, wherein the data matrix comprises a plurality of DSP-Ad Server event data pairs;

d. for each of the plurality of DSP-Ad Server event data pairs in the data matrix:
  i. comparing the data value of each DSP source field with the data value of each corresponding Ad-Server source field to create a set of pair fields;
  ii. assigning a Pair Attribute to each pair field in the set of pair fields, wherein the Pair Attribute for each pair field comprises a first value attribute and a second value attribute, wherein the first value attribute comprises a Boolean attribute indicating one of (a) a field data match of the pair filed and (b) a field data unmatch of the pair field, and wherein the second value attribute comprises one of (a) the data vale of the pair field if the field data is a match and (b) a null value if the field data is an un-match; and
  iii. using the assigned Pair Attributes in the set of pair fields to determine the probability that the DSP event data and the Ad-Server event data of the particular DSP-Ad Server event data pair are both associated with a single real-world ad serve event using a Bayesian analysis according to $$\frac{P1_i \times \prod_{j \neq i}(1-P1_j)}{P1_i \times \prod_{j \neq i}(1-P1_j) + \sum_{j \neq i}(P1_j \times \prod_{k \neq j}[(1-P1_k)])} =$$

$$P1_i \times \frac{\prod_{j \neq i}(1-P1_j)}{P1_i \times \prod_{j \neq i}(1-P1_j) + \sum_{j \neq i}(P1_j \times \prod_{k \neq j}[(1-P1_k)])} = P1_i^*$$

where $P1_i$ is the probability value of each pair field, $j \neq i$ denotes all pairs in a same pair cohort as pair i other than pair i, and $k \neq j$ denotes all pairs in the same pair cohort as pair i other than pair j and including pair i;

e. determining a decision threshold by a clustering classification model; and f. applying the decision threshold to the probability for each pair field in the set of pair fields to determine whether a pair field represents a match.

2. The method of claim 1, wherein the DSP source fields comprise at least one of (a) a timestamp, (b) location information, (c) operating system information, and (d) website information.

3. The method of claim 2, wherein the Ad-Server source fields comprise at least one of (a) a timestamp, (b) location information, (c) operating system information, and (d) website information.

4. The method of claim 1, further comprising the step of prior to creating the event data pairs applying a filter to reduce the number of event data pairs to be created.

5. The method of claim 4 wherein applying the filter comprises the steps of:
  a. segregating the DSP event data into a plurality of unit groups;
  b. segregating the Ad-Server event data into the unit groups;
  c. defining a time-difference window; and
  d. for each of the unit groups, pairing the DSP event data in the unit group and the Ad-Server event data in the unit group and filtering out all pairs that fall outside of the time-difference window.

6. The method of claim 1, wherein the Boolean value of the Pair Attribute indicating a field data match is 1 and the Boolean value of a Pair Attribute indicating a field data unmatch is 0.

7. A system for matching data associated with an ad serve event, the method comprising the steps of:
  a demand-side platform (DSP) comprising one or more computer readable storage devices configured to store a plurality of DSP executable instructions and further comprising one or more DSP hardware computer processors in communication with the one or more DSP computer readable storage devices and configured to execute the plurality of DSP computer executable instructions in order to cause the demand-side platform to generate a set of DSP event data, each piece of DSP event data comprising a series of DSP source fields having a DSP field data value, wherein at least two of the DSP event data are DSP geographic event data;
  an ad server comprising one or more ad server computer readable storage devices configured to store a plurality of ad server executable instructions and further comprising one or more ad server hardware computer processors in communication with the one or more ad server computer readable storage devices and configured to execute the plurality of ad server computer executable instructions in order to cause the ad server to generate a set of ad server event data, each piece of ad server event data comprising a series of ad server source fields having an ad server field data value, wherein at least two of the ad server event data are ad server geographic event data;
  a common server comprising one or more common server computer readable storage devices configured to store a plurality of common server executable instructions and further comprising one or more common server hardware computer processors in communication with the one or more common server computer readable storage devices and configured to execute the plurality of common server computer executable instructions in order to cause the common server to receive from the DSP the set of DSP event data and to receive from the ad server the set of ad server event data, combine each piece of DSP geographic event data into a combined DSP comparison field, combine each piece of ad server event data into a combined ad server comparison field, pair each piece of DSP event data with each piece of ad server event data to create a data matrix wherein the data matrix comprises a plurality of DSP to ad server event data pairs, store the data matrix at the common server computer readable storage devices, and, for each of the plurality of DSP-Ad Server event data pairs in the data matrix, compare the data value of each DSP source field with the data value of each corresponding ad server source field to create a set of pair fields, assign a pair attribute to each pair field in the set of pair fields, wherein the pair attribute for each pair field comprises a first value attribute and a second value attribute, wherein the first value attribute comprises a Boolean attribute indicating one of (a) a field data match of the pair filed and (b) a field data unmatch of the pair field, and wherein the second value attribute comprises one of (a) the data vale of the pair field if the field data is a match and (b) a null value if the field data is an un-match, use the assigned Pair Attributes in the set of pair fields to determine the probability that the DSP event data and the ad server event data of the particular DSP to ad server event data pair are both associated with a single real-world ad serve event using a Bayesian analysis according to $$\frac{P1_i \times \prod_{j \neq i}(1-P1_j)}{P1_i \times \prod_{j \neq i}(1-P1_j) + \sum_{j \neq i}(P1_j \times \prod_{k \neq j}[(1-P1_k)])} =$$

$$P1_i \times \frac{\prod_{j \neq i}(1-P1_j)}{P1_i \times \prod_{j \neq i}(1-P1_j) + \sum_{j \neq i}(P1_j \times \prod_{k \neq j}[(1-P1_k)])} = P1_i^*$$

where $P1_j$, is the probability value of each pair field, $j \neq i$ denotes all pairs in a same pair cohort as pair i other than pair i, and $k \neq j$ denotes all pairs in the same pair cohort as pair i other than pair j and including pair i, determine a decision threshold by a clustering classification model, and apply the decision threshold to the probability for each pair field in the set of pair fields to determine whether a pair field represents a match.

8. The system of claim 7, wherein the DSP source fields comprise at least one of (a) a timestamp, (b) location information, (c) operating system information, and (d) website information.

9. The system of claim 8, wherein the ad server source fields comprise at least one of (a) a timestamp, (b) location information, (c) operating system information, and (d) website information.

10. The system of claim 7, wherein the one or more common server hardware computer processors are further configured to execute the plurality of common server computer executable instructions in order to create the event data pairs by applying a filter to reduce the number of event data pairs to be created.

11. The system of claim 10, wherein applying the filter comprises segregating the DSP event data into a plurality of unit groups, segregating the ad server event data into the unit groups, defining a time-difference window, and, for each of the unit groups, pairing the DSP event data in the unit group and the ad server event data in the unit group and filtering out all pairs that fall outside of the time-difference window.

12. The system of claim 7, wherein the Boolean value of the pair attribute indicating a field data match is 1 and the Boolean value of a pair attribute indicating a field data unmatch is 0.

* * * * *